United States Patent [19]

Case et al.

[11] 3,835,628
[45] Sept. 17, 1974

[54] HEADER FRAME

[75] Inventors: Cecil L. Case, Newton, Kans.;
Robert L. Elder, Yukon, Okla.;
Ferol S. Fell, Hesston, Kans.

[73] Assignee: Hesston Corporation, Hesston, Kans.

[22] Filed: Jan. 10, 1973

[21] Appl. No.: 322,412

Related U.S. Application Data

[63] Continuation-in-part of Ser. No. 161,688, July 12, 1971, Pat. No. 3,716,972.

[52] U.S. Cl................................ 56/14.4, 56/DIG. 1
[51] Int. Cl............................................ A01d 45/02
[58] Field of Search..................... 56/1, DIG. 1, 14.4

[56] References Cited
UNITED STATES PATENTS

| | | | |
|---|---|---|---|
| 2,711,622 | 6/1955 | Cunningham | 56/DIG. 1 |
| 2,911,780 | 11/1959 | Brady | 56/DIG. 1 |
| 2,992,523 | 7/1961 | Oppel | 56/DIG. 1 |

*Primary Examiner*—Russell R. Kinsey
*Attorney, Agent, or Firm*—Schmidt, Johnson, Hovey & Williams

[57] ABSTRACT

A header support frame, universally adapted for use with ground-working and crop-handling headers of various kinds and configurations, has a rearwardly opening, generally U-shaped main section supported above its ground-engaging wheels by virtue of a pair of rearwardly and inwardly inclined struts at the rearmost ends of each side beam of the section. The header selected for use is shiftably carried within the area thus defined by the frame section, the struts, and the wheels by a power lift assembly projecting into the open area from a crossbeam at the forward end of the frame section. A horizontally swingable tongue is coupled with the section at the forward end thereof for attaching the frame and its supported header to a towing vehicle.

11 Claims, 6 Drawing Figures

HEADER FRAME

CROSS REFERENCES

This is a continuation-in-part of our copending application Ser. No. 161,688, filed July 12, 1971, and entitled "Mowing, Conditioning And Windrowing Machine And Method" now U.S. Letters patent No. 3,716,972.

This invention relates to a specially configured header-supporting frame for towable implements and has as an important object to provide a frame which, by virtue of its unique configuration, is ideally suited for universally supporting any one of a variety of ground-working or crop-handling headers without structural modification of the frame.

Another important object of this invention is to provide a strong, sturdy, and rigid header-supporting frame which is highly resistant to structural failure and which protectively embraces a header carried thereby to shield the latter from damage during operation and storage, and to render the implement formed by the combination of the header with the frame highly compact without a multitude of structural components projecting in diverse directions from the implement.

An additional important object of the instant invention is the provision of a header frame which, while fulfilling the above criteria, is of a non-complex, basic design, facilitating attachment of the selected header to the frame.

A further important object of the present invention is the provision of a header frame which affords a large measure of protection and compactness by virtue of its configuration, yet which allows extensive movement of the header between various positions of adjustment such as close to the ground for crop pickup or soil working, or spaced above the ground for over-the-road travel.

As a corollary to the foregoing object, it is an important aim of this invention to provide a header frame which affords such freedom of movement of the header even in those situations where the header has substantial, large, rearwardly projecting structure such as found in a crop-conditioning and windrowing header.

Yet another important object of our invention is the provision of a header frame which lends itself well to towing by virtue of the geometric configuration of the frame and its rearwardly inclined, wheel-supporting struts which enable the frame to climb over low profile obstacles with ease.

A still further important object of our invention is the provision of a wheeled header-supporting frame wherein the ground-engaging wheels are inset with respect to the outermost side extremities of the frame to preclude damage to adjacent crops not yet processed by the implement, yet are so located that they in no way interfere with the operation of the header or its adjusting movement.

Figure 1:
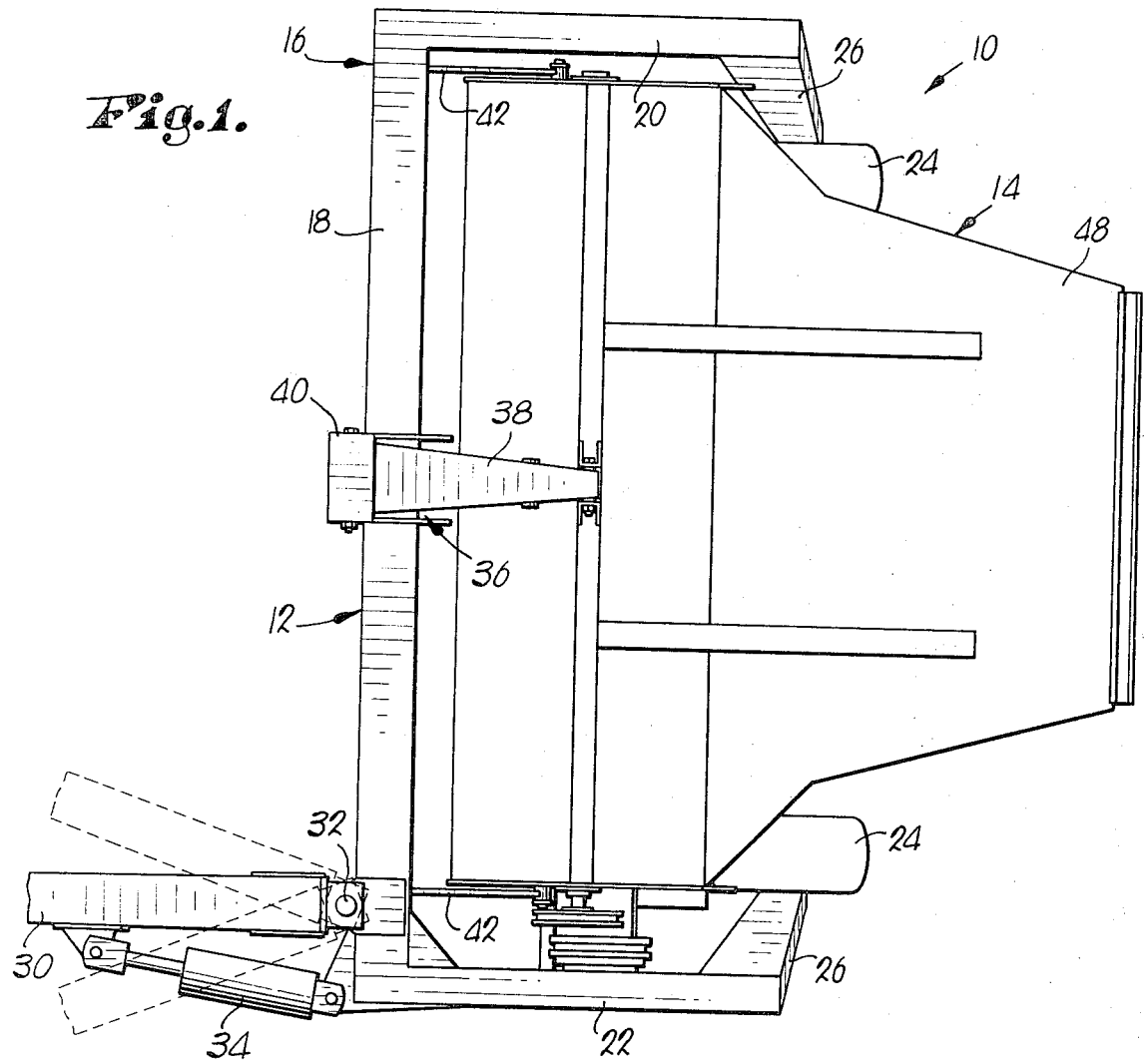
FIG. 1 is a fragmentary, top plan view of a header frame embodying the principles of the present invention, the frame being shown with a conditioning and windrowing header mounted thereon for purposes of illustration.

The implement 10 consists of two major components, i.e., a frame 12 constructed in accordance with the principles of the present invention, and a header 14. The header 14 has been shown as a combination conditioning and windrowing header such as shown and described in our aforementioned U.S. Pat. No. 3,716,972. It is to be understood, however, that header 14 is not limited to any one particular type of attachment but may be of various sizes and configurations in accordance with the particular type of implement 10 which is to be constructed. As will hereinafter appear, the novel qualities embodied within frame 12 are not dependent upon the type of header chosen for association with frame 12.

The frame 12 is of a basic, non-complex design having a normally horizontally disposed, rearwardly opening main upper section 16 which is U-shaped in configuration, section 16 having a front crossbeam 18 forming the bight thereof, and a pair of rearwardly extending side beams 20 and 22 integral with crossbeam 18 which form the legs of section 16. Section 16 is supported at the rear thereof by a pair of laterally spaced, ground-engaging wheel elements 24 each of which has a rigid, generally upright strut 26 which connect the same with their respective side beams 20 and 22 at the rearmost ends of the latter. By virtue of struts 26, the section 16 is thus spaced above wheels 24, and a rearwardly opening area is defined for header 14 by the crossbeam 18, the side beams 20 and 22, and the struts 26 with their attendant wheels 24. The area thus defined extends vertically between the ground 28 and the section 16, and horizontally from the crossbeam 18 rearwardly through the space between wheels 24.

Figure 3:
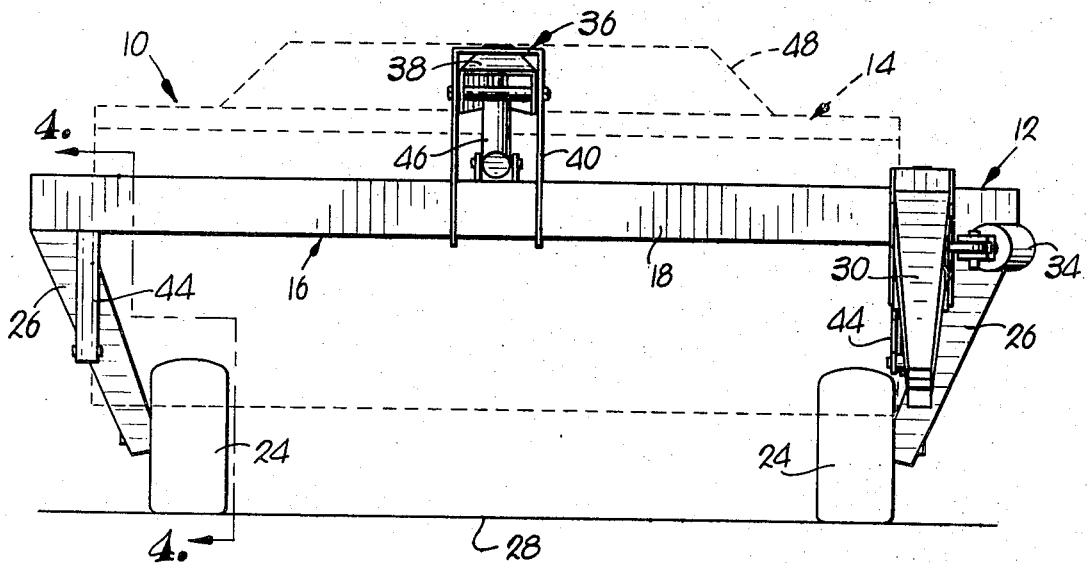
FIG. 3 is a front elevational view of the frame, the header being shown in phantom.
Figure 4:
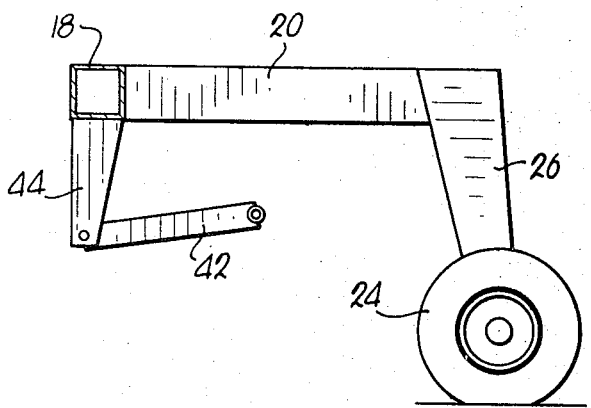
FIG. 4 is a fragmentary, cross-sectional view of the frame taken along line 4—4 of FIG. 3.
Figure 5:
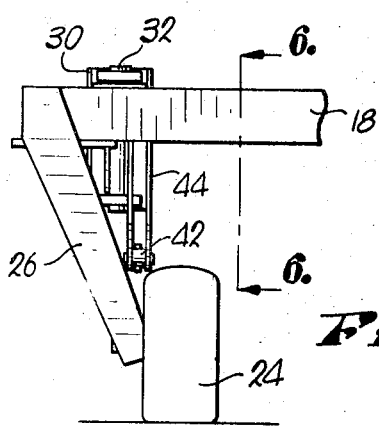
FIG. 5 is a fragmentary, rear elevational view of the frame.
Figure 6:
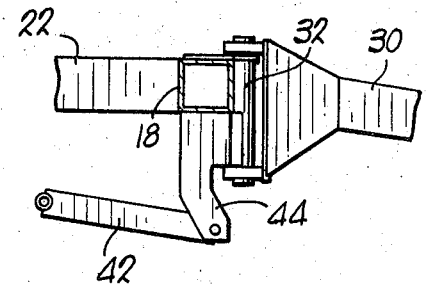
FIG. 6 is a fragmentary, cross-sectional view of the frame taken along line 6—6 of FIG. 5.

It is important to note that the struts 26 are inclined both rearwardly and inwardly from their respective side beams 20 and 22 so that an obtuse angle is presented between each strut 26 and its side beam 20 or 22 and the wheels 24 are set-in with respect to side beams 20 and 22. As shown best in FIG. 3, because of their inward inclination, the struts 26 converge toward one another as the wheels 24 are approached.

The frame 12 is "nose-heavy" because of the rearwardly spaced location of wheels 24 with respect to the center of gravity of frame 12, thereby creating a tendency for the front of frame 12 to pivot downwardly about the axis of wheels 24. However, a tongue 30 is provided at the left front corner of frame 12 for coupling the implement 10 to a towing vehicle and for thereby supporting the front of frame 12 at substantially the same level as the rear thereof during use. The tongue 30 is pivotally coupled with the crossbeam 18 for swinging about a vertical axis 32, and a fluid pressure piston and cylinder unit 34 interconnects tongue 30 and section 16 for powered swinging of tongue 30 between the dotted-line positions shown in FIG. 1.

Figure 2:
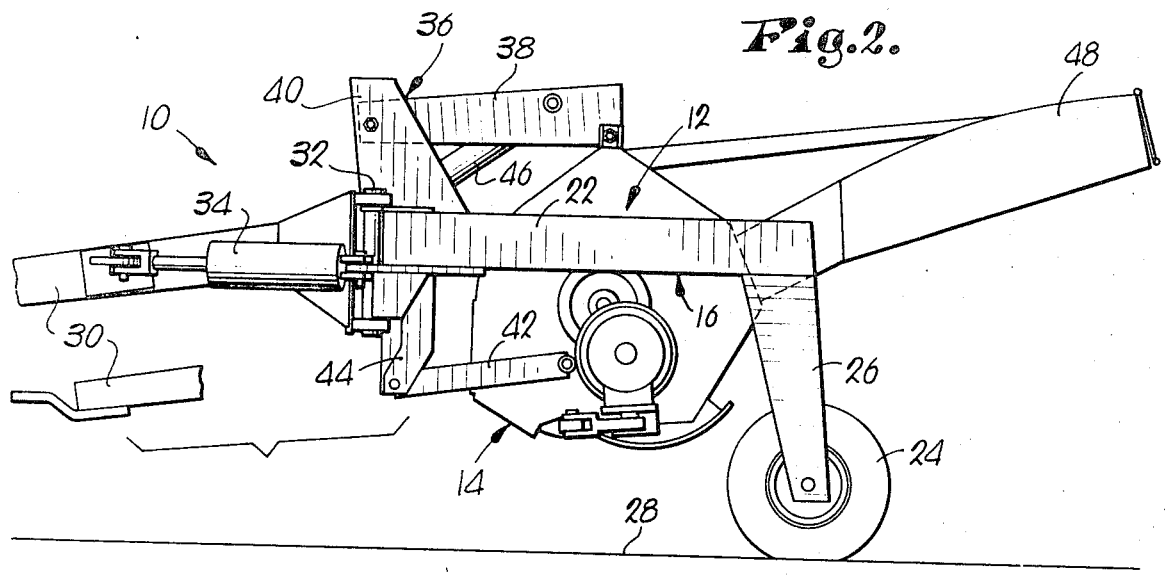
FIG. 2 is a fragmentary, side elevational view of the frame and associated header.

The frame 12 also includes a support assembly, broadly denoted by the numeral 36, which carries the header 14 within the open area defined by section 16, the struts 26 and the wheels 24. Assembly 36 includes a four-point linkage arrangement comprising an overhead lifting link 38 pivotally connected at one end to a centrally located upright 40 on crossbeam 18 and at the opposite end to the top of header 14, and a pair of lower stabilizing links 42 respectively coupled at one end to a downwardly projecting mounting lug 44 on crossbeam 18 and at the opposite end to the corresponding side of header 14. The links 38 and 42 project rearwardly from crossbeam 18 into the header-receiving area and thus provide a means for swinging of header 14 between an operational position closely adjacent to or in engagement with the ground 28, and an over-the-road, raised position illustrated in FIGS. 1–3. A second fluid pressure piston and cylinder unit 46 interconnects upright 40 and lifting link 38 to provide powered swinging of the header 14.

By virtue of the U-shaped configuration of section 16, it will be seen that the header 14 is embraced by the crossbeam 18 and the side beams 20 and 22. In this manner, the front and sides of header 14 are well protected, and the implement 10 as a whole is rendered substantially compact without portions of the header 14 projecting beyond the front and side confines of frame 12 as defined by crossbeam 18 and side beams 22. However, because section 16 is open across the rear thereof, special headers having extensive rearwardly projecting portions such as the windrow forming housing 48 of header 14 are readily accommodated by frame 12 with complete freedom for the special headers 14 to swing in an arcuate path through links 38 and 42 as controlled by power unit 46.

Moreover, by virtue of the geometry of the frame 12 which places its center of gravity forwardly of wheels 24, trailering of implement 10 is enhanced when tongue 30 is coupled with a towing vehicle. In this respect, it has been found that the rearward inclination of struts 26 permits the implement 10 to be more easily pulled over obstructions on the ground, both during use in the field and over-the-road travel. This is believed, in part, to be attributed to the fact that a more direct pull is applied to the wheels 24 as the angle between struts 26 and the corresponding side beams 20 and 22 is increased.

A further important benefit is derived from the location of the wheels 24 with respect to the path of travel of the implement 10. To this end, the inwardly inclined attitude of the struts 26 causes the wheels 24 to be located within the swath of the header 14, thereby assuring that adjacent crops alongside the implement 10 are not damaged by the wheels 24 as implement 10 is advanced. On the other hand, wheels 24 are spaced sufficiently far apart that they do not interfere with one or more windrows, for example, formed by the header 14 as the implement advances.

Having thus described the invention, what is claimed as new and desired to be secured by Letters Patent is:

1. A multipurpose header frame for a mobile implement comprising:
    a generally U-shaped, normally horizontally disposed, rearwardly opening main section having an elongated crossbeam extending transversely to the normal path of travel of the implement and a pair of side beams rigid to said crossbeam and extending rearwardly therefrom at opposite ends of the crossbeam;
    a pair of laterally spaced apart ground-engaging means; a strut rigid to and depending from the rear end of each of said side beams respectively and mounting the rear of said section on said ground-engaging means in spaced relationship above the latter to define a header-receiving area bounded at the front by said crossbeam, at the sides by said side beams, and extending between the section and the ground;
    means for coupling the front of said section to a towing vehicle and holding said crossbeam against vertical swinging relative to said ground-engaging means; and
    a header support assembly on the section projecting into said area for mounting a header on the frame within said area and embraced by said beams,
    said struts being inclined inwardly toward one another at their lower ends to position said ground-engaging means inside the lateral confines of said side beams and at the rear of said area.

2. A header frame as claimed in claim 1, wherein each of said struts is inclined rearwardly from its side beam.

3. A header frame as claimed in claim 1, wherein said assembly includes means for raising and lowering said header within said area relative to said section.

4. A header frame as claimed in claim 1, wherein said assembly includes linkage pivotally coupled with said crossbeam for swingably supporting said header.

5. A header frame as claimed in claim 4, wherein said linkage includes a power-operated, top lifting link and a pair of lower, laterally spaced-apart stabilizing links.

6. A header frame as claimed in claim 1, wherein said coupling means includes an elongated tongue pivotally coupled at one end to said section for horizontal swinging to vary the lateral disposition of the frame relative to the towing vehicle.

7. A header frame as claimed in claim 6, wherein is provided power means interconnecting the tongue and said section for effecting controlled swinging of the tongue.

8. In a support for a header of a mobile farm implement:
    a U-shaped frame including:
        an elongated, front bight spaced above the ground and having its longitudinal axis disposed horizontally in transverse relation to the normal path of travel of the implement, and
        a pair of elongated, horizontally spaced legs rigid to and extending rearwardly from said bight;
    a strut rigid to and depending from each of said legs respectively at the rearmost ends of said legs;
    a ground-engaging wheel coupled with each strut respectively at the lowermost ends of the struts; and means for coupling said frame with a towing vehicle and holding said bight against vertical swinging relative to said wheels,
    each of said struts sloping rearwardly from its leg to facilitate travel of the implement up and over groundlevel obstructions.

9. A support for a header as claimed in claim 8, wherein the struts are inclined inwardly whereby the distance between said lowermost ends thereof is less than the distance between said legs.

10. A support for a header as claimed in claim 8, wherein the wheels are inboard of their struts.

11. A support for a header as claimed in claim 8, wherein the longitudinal axes of the legs are horizontal.

* * * * *